United States Patent [19]

Succi et al.

[11] Patent Number: 5,492,682
[45] Date of Patent: Feb. 20, 1996

[54] HYDROGEN PURIFICATION

[75] Inventors: Marco Succi; Carolina Solcia, both of Milan, Italy; D'Arcy Lorimer, San Luis Obispo, Calif.

[73] Assignee: SAES Getters S.p.A., Milan, Italy

[21] Appl. No.: 230,707

[22] Filed: Apr. 21, 1994

[30] Foreign Application Priority Data

Apr. 29, 1993 [IT] Italy .................. MI93A0851

[51] Int. Cl.⁶ .............................. C01B 31/18; C01G 1/04
[52] U.S. Cl. .................. 423/210; 422/171; 423/219; 423/230; 423/239.1; 423/245.1; 423/246; 423/417
[58] Field of Search .................. 423/417, 248, 423/246, 230, 210, 239.1, 245.1, 219

[56] References Cited

U.S. PATENT DOCUMENTS

| | | | |
|---|---|---|---|
| 2,533,138 | 12/1950 | Newton | 423/246 |
| 4,045,541 | 8/1977 | Mercer | 423/417 |
| 4,075,312 | 2/1978 | Tanaka et al. | 423/644 |
| 4,769,225 | 9/1988 | Reilly et al. | 423/248 |

FOREIGN PATENT DOCUMENTS

| | | |
|---|---|---|
| 0240270 | 10/1987 | European Pat. Off. . |
| 3210381 | 5/1983 | Germany . |
| 1527169 | 12/1989 | U.S.S.R. .................. 423/417 |
| 1650595 | 5/1991 | U.S.S.R. .................. 423/417 |
| 2177079 | 1/1987 | United Kingdom . |

OTHER PUBLICATIONS

Heimbach et al "Removal of Nitrogen and Methane from Hydrogen by Metal Getters", Fusion Technology, vol. 1, pp. 421–426 (no date available).

Albrecht et al "Applicatin of SAES & AWT Gas Purifiers . . . " J. Less Common Metals 172–174 (1991) 1157–1167.

Primary Examiner—Wayne Langel
Attorney, Agent, or Firm—Hickman & Beyer

[57] ABSTRACT

An improved apparatus and process for the removal of gaseous impurities from an impure gas stream of hydrogen contaminated with carbon monoxide, and with one or more additional impurities such as carbon dioxide, oxygen, nitrogen, water, methane.

The impure gas stream is first contacted with elemental nickel in a first reaction zone under nickel-carbonyl forming conditions thereby converting substantially all the carbon monoxide to nickel carbonyl, thereby producing a partially purified gas stream.

The partially purified gas stream is then contacted with $Ti_2Ni$ or certain manganese-containing alloys in a second reaction zone to produce a fully purified gas stream.

34 Claims, 1 Drawing Sheet

HYDROGEN PURIFICATION

This invention relates in general to hydrogen purification by which is meant an improved process for the removal of gaseous impurities from an impure gas stream of hydrogen contaminated with carbon monoxide, and with one or more additional impurities. The additional impurities can be carbon dioxide, oxygen, nitrogen, water, and/or methane. Methane is frequently present in commercially available impure hydrogen at a level of 5 parts per million (ppm) which is 5,000 parts per billion (ppb). Methane can also be formed in situ by the reaction of the hydrogen with the carbon monoxide and/or carbon dioxide. Methane formation is avoided in this new improved process. This process can be employed to purify impure hydrogen such that the resultant purified gas contains less than 50 ppb or even less than 20 ppb of methane i.e. less than 20 parts by volume of methane per 1,000,000,000 parts by volume of hydrogen.

The semiconductor industry is developing integrated circuits with ever increasing line densities requiring that the materials used in the manufacturing process be of ever increasing purity. As hydrogen is one of the gases used in these processes, it must be as pure as possible. The impurities present in commercially available hydrogen include: carbon monoxide, and one or more additional impurities. The additional impurities can be carbon dioxide, oxygen, nitrogen, water, and/or methane.

One prior method for the purification of impure hydrogen is the selective diffusion of hydrogen through palladium or palladium alloys as described for example in U.S. Pat. No. 3,534,531. Such processes suffer from a number of disadvantages. Unfortunately the rate of diffusion increases with the pressure drop across the palladium barrier. Another disadvantage is the requirement for a high operating temperature in order to achieve an economical throughput. Furthermore, as the impurities are blocked by the palladium barrier, a removal device must be provided. Such a removal device is described in U.S. Pat. No. 3,368,329. Removal devices are expensive to acquire and costly to maintain. Another disadvantage is the propensity of the palladium barrier to rupture with consequential leakage of impurities into the purified gas stream. This propensity is all the more prevalent because of the incentive to make the palladium barrier thin and to increase the differential pressure in order to increase the throughput. The use of high-temperature, high-pressure hydrogen is dangerous because of its propensity to explosively, exothermically combine with atmospheric oxygen. Finally palladium is expensive.

Accordingly it is an object of the present invention to provide an improved process for the purification of impure hydrogen substantially free of one or more of the disadvantages of prior process for the purification of impure hydrogens.

Another object is to provide an improved process for the purification of impure hydrogen which does not require the use of either palladium or its alloys or its compounds.

Another object is to provide an improved process for the purification of impure hydrogen which does not require the use of a diffusion membrane.

Another object is to provide an improved process for the purification of impure hydrogen which does not require the heating of the impure hydrogen.

Another object is to provide an improved process for the purification of impure hydrogen which does not require the use of hydrogen under pressure.

Another object is to provide an improved process for the purification of impure hydrogen which avoids the production of methane by the reaction of the hydrogen with either the carbon monoxide or the carbon dioxide which is present.

According to the present invention there is provided: an improved process for the removal of gaseous impurities from an impure gas stream of hydrogen contaminated with carbon monoxide, and with one or more additional impurities. These impurities are carbon dioxide, oxygen, nitrogen, water, and/or methane, and mixture thereof. The process comprises the steps of:

I. contacting the impure gas stream with elemental nickel in a first reaction zone under nickel-carbonyl forming conditions thereby converting substantially all the carbon monoxide to nickel carbonyl, to produce a partially purified gas stream; and then II. contacting the partially purified gas stream with $Ti_2Ni$ in a second reaction zone under reacting conditions to produce a fully purified gas stream.

In another embodiment of the present invention the $Ti_2Ni$ is replaced with an alloy of Ti, V, Fe, and Mn wherein: (a) the weight ratio of Ti:V is from about 1:100 to about 100:1; (b) the weight ratio of Ti:Fe is from about 1:100 to about 100:1; and (c) the weight ratio of Ti:Mn is from about 1:100 to about 100:1.

The pressure in both Step I and Step II is generally from about 1 to about 20 bar.

The temperature in Step II is generally from about 400° to 600° C. and is preferably from about 500° to about 600° C.

The elemental nickel, and the nickel compounds such as nickel oxide if present, can be employed unsupported but is preferably supported on a carrier having a surface area generally greater than 100 and preferably greater than 200 square meters per gram of weight based on the weight of the carrier.

A wide variety of carriers can be employed for the nickel, but is preferably of silicalite, titanium silicalite and silica as described in U.S. Pat. No. 4,713,224, and xerogel as shown in EP-A-537851.

The nickel containing bed can be followed or proceeded by a sorbing bed consisting essentially of a natural or synthetic molecular sieve; in alternative the nickel bed can be interposed between two molecular sieve beds. Examples of such molecular sieves include natural or synthetic zeolites, silicalites or titanium silicalites.

The second reaction zone can be of any form but is preferably a housing with uniformly polished inner walls having a roughness expressed in centerline average height less than 0.5 microns and preferably less than 0.25 microns.

A wide variety of gas stream velocities can be employed but the partially purified gas stream in Step II preferably has a velocity of from about 0.5 to about 50 cubic centimeters per minute per gram of $Ti_2Ni$ or per gram of alloy when measured at a pressure of 760 mm Hg and 20° C.

The $Ti_2Ni$ and the alloy is preferably in the form of a loose powder having an average particle size of from about 1 to about 500 microns and preferably from about 1 to about 250 microns. In one embodiment this powder can advantageously be pressed to form pellets having a diameter from about 0.5 to about 5 mm.

Shaping into pellets can be carried out by compression or by sintering. Sintering can be carried out by heating of the powder alone or in combination with a second powder as described in GB Patent Publication No. 2,077,487 in order to reach a satisfactory level of porosity. The resultant pellets generally have a diameter of from about 0.5 to 5 mm.

According to another aspect of the present invention there is provided an improved apparatus for the removal of gaseous impurities from the above-described impure gas stream of hydrogen. The apparatus comprises:

A. a first reaction zone containing elemental nickel; and

B. the impure gas stream; and

C. means for conveying the impure gas stream to the first reaction zone; and

D. means for maintaining said first reaction zone under nickel-carbonyl forming conditions thereby converting substantially all the carbon monoxide to nickel carbonyl, thereby producing an effluent stream form the first zone which effluent stream is a partially purified gas stream; and E. a second zone containing either the $Ti_2Ni$ or the alloy; and F. means for conveying the partially purified gas stream from the first zone to the second reaction zone; and G. means for maintaining the second reaction zone under methane reacting conditions to produce a fully purified gas stream.

Figure 1:
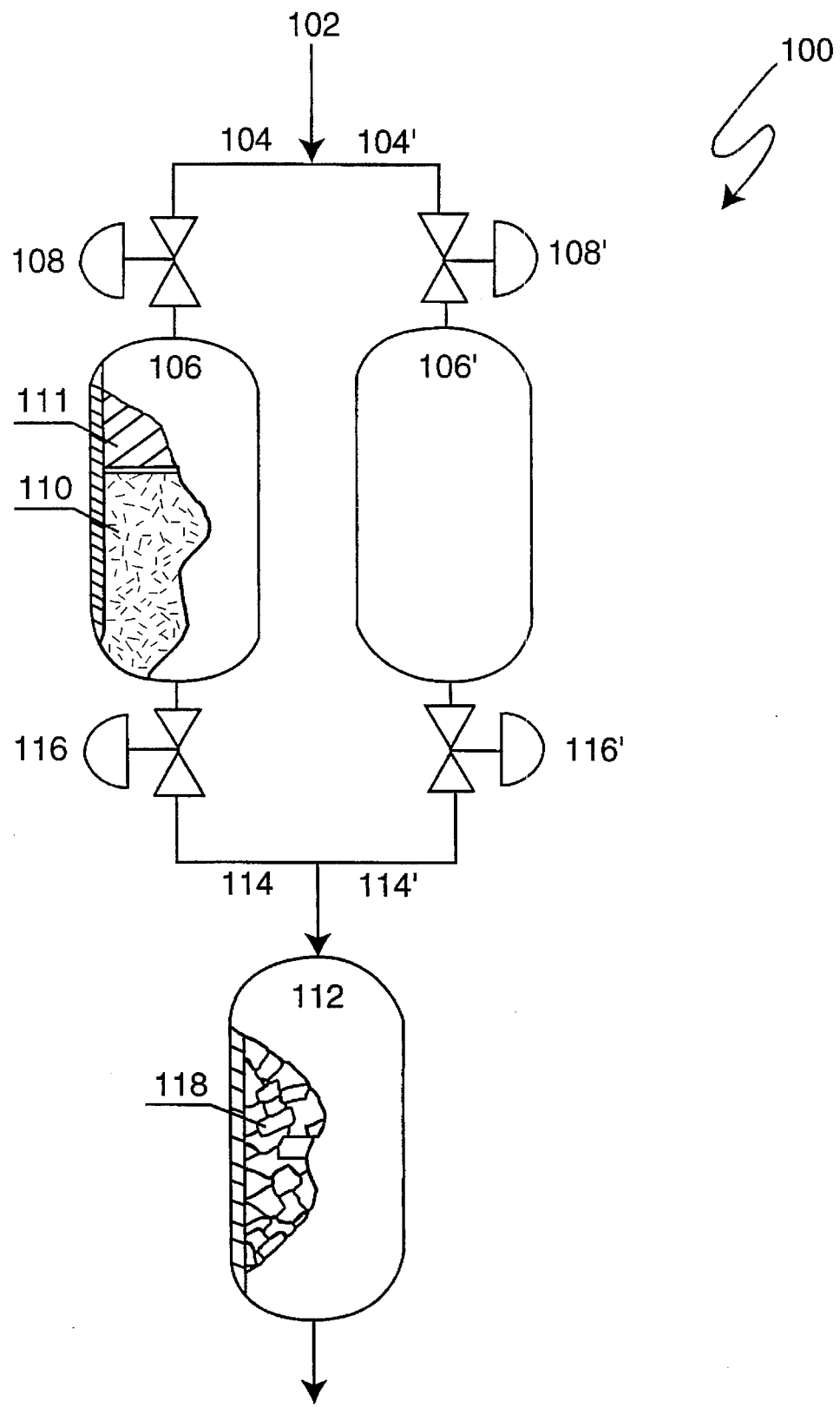
FIG. 1 is a schematic view of an apparatus capable of practicing the improved process of the present invention. Referring now to the single FIGURE of the drawing there is shown a purifier 100 for the removal of impurities from an impurity-containing gas stream. The purifier 100 has a gas inlet 102 in fluid communication through pipes 104, 104' with preliminary chambers 106, 106'. Valves 108, 108' can be alternately opened or closed to allow the passage of the impurity-containing gas through the first or the second of the preliminary purification chambers 106, 106' containing a bed of particulate material 110, based on supported nickel whereby the bed removes, at a relatively low temperature, the relatively easily removable impurities such as carbon monoxide and carbon dioxide. Chambers 106, 106' may in addition contain a natural or synthetic molecular sieve 111 to better promote the removal of carbon dioxide, or alternatively a separate molecular sieve can be provided. The chambers 106, 106' can also remove moisture down to trace levels, but do not remove nitrogen or methane.

In accordance with the present invention it is possible to obtain a partially purified hydrogen-gas-mixture containing only a second class of impurities which are nitrogen and methane. The partially purified gas-mixture leaves preliminary purification chambers 106, 106' entering a final purification chamber 112, kept at a much higher temperature and with which chambers 106, 106' are in fluid communication by means of pipes 114, 114'. Valves 116, 116' control the flow of the partially purified gas from either of the first preliminary purification chambers 106, 106', which allow the regeneration of nickel in one chamber while the other chamber is working. In said final purification chamber 112, the partially purified hydrogen comes in contact with a bed of material 118.

The invention will be understood by the following examples wherein all parts and percentages are by weight unless otherwise indicated. These examples are designed to teach those skilled in the art how to practice the present invention and represent the best mode presently known for carrying out the present invention.

EXAMPLE 1

This examples illustrates a preferred embodiment of the present invention employing $Ti_2Ni$.

An impure gas stream contaminated with 5000 parts per billion ("ppb") of methane, traces of nitrogen, traces of $CO_2$, traces of CO, balance hydrogen was allowed to flow at a rate of 100 cc/min at a pressure of 4 bar at room temperature into a first reaction zone in a chamber 106 containing two beds of sorbing material. Upstream is a bed 111 of synthetic zeolite. Downstream is a bed 110 containing 20 grams of a certain nickel catalyst. The nickel catalyst contains 58% by weight atomic nickel. Of the entire amount of the atomic nickel, 5% by weight is elemental metallic nickel and 95% by weight is in the form of nickel oxide. The nickel is supported on a silica carrier. The catalyst has a surface area of about 100 square meters per gram. This catalyst is sold by the Engelhardt company under the trade name "Ni 0104T". It can be seen that in the first reaction zone the impure gas stream is contacted with elemental nickel under nickel-carbonyl forming conditions thereby converting substantially all the carbon monoxide to nickel carbonyl, to produce a partially purified gas stream. This partially purified gas stream is free of even the graces of CO present in the original gas. The amount of CO if present is so low as to be unmeasurable.

The partially purified gas stream is then led to a second reaction zone where it is contacted with 40 grams $Ti_2Ni$ at 550° C. produce a fully purified gas stream free of methane, free of CO and free of $CO_2$. The $Ti_2Ni$ is in the form of a loose powder having an average particle size of from one to 150 microns.

The level of methane was measured at the outlet of the second zone by means of a Valco gas chromatograph employing a metastable helium ionization detector having a sensitivity of 5 ppb of methane. At the beginning of the test no methane could be detected, apparently because the fresh $Ti_2Ni$ was sorbing all the methane. At a certain later point in time a trace of methane was detected. The test was arrested when the methane level increased to 50 ppb. From the elapsed time it was calculated that greater than about 1.36 liter-torr of methane per gram of $Ti_2Ni$ had been sorbed. This value is reported in Table 1 as sorption capacity.

EXAMPLE 2

This example illustrates another preferred embodiment of the present invention employing a getter alloy having a small amount of manganese.

The procedure of Example 1 is repeated except that the $Ti_2Ni$ is replaced by a getter alloy having the following composition: 56.7% Ti; 30.2% V; 6.6% Fe; 6.5% Mn. This alloy contains 6.5% by weight manganese and is referred to below as "low Mn alloy". The sorption capacity is measured and is reported in Table 1.

EXAMPLE 3

This example illustrates a preferred embodiment of the present invention employing a getter alloy having a high amount of manganese.

The procedure of Example 1 is repeated except that the $Ti_2Ni$ is replaced by a getter alloy having the following composition: 30.1% Ti; 14.4% V; 10.5% Fe; 44.9% Mn. This alloy contains 44.9% by weight manganese and is referred to below as "high Mn alloy". The sorption capacity is measured and is reported in Table 1.

TABLE 1

| Example No. | Getter material | Sorption Capacity (Liter-torr/gm) |
| --- | --- | --- |
| 1 | $Ti_2Ni$ | 1.36 |

TABLE 1-continued

| Example No. | Getter material | Sorption Capacity (Liter-torr/gm) |
|---|---|---|
| 2 | Low Mn alloy | 0.96 |
| 3 | High Mn alloy | 1.22 |

Although the invention has been described in considerable detail with respect to certain preferred embodiments thereof, it will be understood that variations are within the skill of the art without departing from the spirit of the invention as described above and as defined in the appended claims.

What is claimed is:

1. A process for the removal of gaseous impurities from an impure hydrogen gas stream contaminated with carbon monoxide, and one or more additional impurities selected from the group consisting of carbon dioxide, oxygen, nitrogen, water, methane, and mixtures thereof, thereby producing a purified hydrogen gas stream; said process comprising the steps of:
   I. contacting said impure hydrogen gas stream with elemental nickel in a first reaction zone under nickel-carbonyl forming conditions to convert thereby substantially all the carbon monoxide in said impure hydrogen gas stream to nickel carbonyl, producing a partially purified hydrogen gas stream; and then
   II. contacting the partially purified hydrogen gas stream with $Ti_2Ni$ in a second reaction zone under reacting conditions to produce a fully purified hydrogen gas stream.

2. The process of claim 1 wherein the pressure in Step I is from about 1 to about 20 bar.

3. The process of claim 1 wherein the pressure in Step II is from about 1 to about 20 bar.

4. The process of claim 1 wherein the temperature in Step II is from 400° to 600° C.

5. The process of claim 1 wherein the temperature in Step II is from 500° to 600° C.

6. The process of claim 1 wherein the elemental nickel is supported on a carrier having a surface area greater than 100 square meters per gram of weight based on the weight of the carrier.

7. The process of claim 1 wherein the elemental nickel is supported on a carrier having a surface area greater than 200 square meters per gram of weight based on the weight of the carrier.

8. The process of claim 1 wherein the carrier is selected from the group consisting of silicalite, titanium silicalite and silica.

9. The process of claim 1 wherein the second reaction zone is in a housing with uniformly polished inner walls having a roughness expressed in centerline average height less than 0.5 microns.

10. The process of claim 1 wherein the second reaction zone is in a housing with uniformly polished inner walls having a roughness expressed in centerline average height less than 0.25 microns.

11. The process of claim 1 wherein the partially purified gas stream in Step II has a velocity of from about 0.5 to about 50 cubic centimeters per minute per gram of $Ti_2Ni$ when measured at a pressure of 760 mm Hg and 20° C.

12. The process of claim 1 wherein the impure gas stream contains about 5 ppm of methane based on the weight of the impure gas stream.

13. The process of claim 1 wherein the $Ti_2Ni$ is in the form of a loose powder having an average particle size of from about 1 to about 500 microns.

14. The process of claim 1 wherein the $Ti_2Ni$ is in the form of a loose powder having an average particle size of from about 1 to about 250 microns.

15. The process of claim 1 wherein the $Ti_2Ni$ is in the form of pellets having a diameter from about 0.5 to about 5 mm.

16. A process for the removal of gaseous impurities from an impure hydrogen gas stream contaminated with carbon monoxide, and one or more additional impurities selected from the group consisting of carbon dioxide, oxygen, nitrogen, water, methane, and mixtures thereof, thereby producing a purified hydrogen gas stream; said process comprising the steps of:
   I. contacting said impure hydrogen gas stream with elemental nickel in a first reaction zone at a pressure of from about 1 bar to about 20 about bar, under nickel-carbonyl forming conditions to convert thereby substantially all the carbon monoxide in said impure hydrogen gas stream to nickel carbonyl, producing a partially purified hydrogen gas stream; and then
   II. contacting the partially purified hydrogen gas stream with $Ti_2Ni$ in a second reaction zone at a pressure of from about 1 bar to about 20 bar at a temperature of from about 400° C. to about 600° C. under reacting conditions to produce a fully purified hydrogen gas stream;

wherein said elemental nickel is supported on a carrier having a surface area greater than 100 square meters per gram of weight based on the weight of the carrier;

wherein the carrier is selected from the group consisting of silicate, titanium silicate and silica;

wherein the second reaction zone is in a housing with uniformly polished inner walls having a roughness expressed in centerline average height less than 0.25 microns;

wherein the partially purified hydrogen gas stream in Step II has a velocity of from about 0.5 cubic centimeters per minute to about 50 cubic centimeters per minute per gram of $Ti_2Ni$ when measured at a pressure of 760 mm Hg and a temperature of 20° C.; and wherein the $Ti_2Ni$ is in the form of a loose powder having an average particle size of from about 1 micron to about 250 microns.

17. The process of claim 16 wherein the elemental nickel is supported on a carrier having a surface area greater than 200 square meters per gram of weight based on the weight of the carrier.

18. A process for the removal of gaseous impurities from an impure hydrogen gas stream contaminated with carbon monoxide, and one or more additional impurities selected from the group consisting of carbon dioxide, oxygen, nitrogen, water, methane, and mixtures thereof, thereby producing a purified hydrogen gas stream; said process comprising the steps of:
   I. contacting said impure hydrogen gas stream with elemental nickel in a first reaction zone under nickel-carbonyl forming conditions to convert thereby substantially all the carbon monoxide in said impure hydrogen gas stream to nickel carbonyl, producing a partially purified hydrogen gas stream; and then
   II. contacting the partially purified hydrogen gas stream with an alloy of Ti, V, Fe, and Mn wherein:
   the weight ratio of Ti:V is from about 1:100 to about 100:1;
   the weight ratio of Ti:Fe is from about 1:100 to about 100:1; and the weight ratio of Ti:Mn is from about 1:100 to about 100:1;

19. The process of claim 18 wherein the pressure in Step I is from about 1 to about 20 bar.

20. The process of claim 18 wherein the pressure in Step II is from about 1 to about 20 bar.

21. The process of claim 18 wherein the temperature in Step II is from 400° to 600° C.

22. The process of claim 18 wherein the temperature in Step II is from 500° to 600° C.

23. The process of claim 18 wherein the elemental nickel is supported on a carrier having a surface area greater than 100 square meters per gram of weight based on the weight of the carrier.

24. The process of claim 18 wherein the elemental nickel is supported on a carrier having a surface area greater than 200 square meters per gram of weight based on the weight of the carrier.

25. The process of claim 18 wherein the carrier is selected from the group consisting of silicalite, titanium silicalite and silica.

26. The process of claim 18 wherein the second reaction zone is in a housing with uniformly polished inner walls having a roughness expressed in centerline average height less than 0.5 microns.

27. The process of claim 18 wherein the second reaction zone is in a housing with uniformly polished inner walls having a roughness expressed in centerline average height less than 0.25 microns.

28. The process of claim 18 wherein the partially purified gas stream in Step II has a velocity of from about 0.5 to about 50 cubic centimeters per minute per gram of alloy when measured at a pressure of 760 mm Hg and 20° C.

29. The process of claim 18 wherein the impure gas stream contains about 5 ppm of methane based on the weight of the impure gas stream.

30. The process of claim 18 wherein the alloy is in the form of a loose powder having an average particle size of from about 1 to about 500 microns.

31. The process of claim 18 wherein the alloy is in the form of a loose powder having an average particle size of from about 1 to about 250 microns.

32. The process of claim 18 wherein the alloy is in the form of pellets having a diameter from about 0.5 to about 5 mm.

33. A process for the removal of gaseous impurities from an impure hydrogen gas stream contaminated with carbon monoxide, and one or more additional impurities selected from the group consisting of carbon dioxide, oxygen, nitrogen, water, methane, and mixtures thereof, thereby producing a purified hydrogen gas stream; said process comprising the steps of:
  I. contacting said impure hydrogen gas stream with elemental nickel in a first reaction zone under nickel-carbonyl forming conditions to convert thereby substantially all the carbon monoxide in said impure hydrogen gas stream to nickel carbonyl, producing a partially purified hydrogen gas stream; and then
  II. contacting the partially purified hydrogen gas stream having a manganese-containing alloy of Ti, V, Fe, and Mn wherein:
    the weight ratio of Ti:V is from about 1:100 to about 100:1;
    the weight ratio of Ti:Fe is from about 1:100 to about 100:1; and
    the weight ratio of Ti:Mn is from about 1:100 to about 100:1;
  wherein the elemental nickel is supported on a carrier having a surface area greater than 100 square meters per gram of weight based on the weight of the carrier;
  wherein the carrier is selected from the group consisting of silicate, titanium silicate and silica;
  wherein the second reaction zone is in a housing with uniformly polished inner walls having a roughness expressed in centerline average height less than 0.25 microns;
  wherein the partially purified hydrogen gas stream in Step II has a velocity of from about 0.5 cubic centimeters per minutes to about 50 cubic centimeter per minute per gram of manganese-containing alloy when measured at a pressure of 760 mm Hg and a temperature of 20+ C.; and
  wherein manganese-containing alloy is in the form of a loose powder having an average particle size of from about 1 micron to about 250 microns.

34. The process of claim 33 wherein the elemental nickel is supported on a carrier having a surface area greater than 200 square meters per gram of weight based on the weight of the carrier.

* * * * *

UNITED STATES PATENT AND TRADEMARK OFFICE
CERTIFICATE OF CORRECTION

PATENT NO.  : 5,492,682
DATED       : February 20, 1996
INVENTOR(S) : Succi, et al.

It is certified that error appears in the above-indentified patent and that said Letters Patent is hereby corrected as shown below:

Column 4, line 17, change "graces" to --traces--

Column 8, line 35, change "20+C to --20°C--

Column 6, line 16, after "20", delete "about"

Signed and Sealed this

Fifteenth Day of October, 1996

Attest:

BRUCE LEHMAN

*Attesting Officer*          *Commissioner of Patents and Trademarks*